United States Patent
Kang et al.

(10) Patent No.: US 9,113,493 B2
(45) Date of Patent: *Aug. 18, 2015

(54) METHOD OF REQUESTING ALLOCATION OF UPLINK RESOURCES FOR EXTENDED REAL-TIME POLLING SERVICE IN A WIRELESS COMMUNICATION SYSTEM

(75) Inventors: Hyun-Jeong Kang, Seoul (KR); Jung-Won Kim, Seoul (KR); Jung-Je Son, Gyeonggi-do (KR); Hyoung-Kyu Lim, Seoul (KR); Yeong-Moon Son, Gyeonggi-do (KR); Sung-Jin Lee, Gyeonggi-do (KR); Chang-Hoi Koo, Gyeonggi-do (KR); Pan-Yuh Joo, Seoul (KR); Young-Ho Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 125 days.

This patent is subject to a terminal disclaimer.

(21) Appl. No.: 13/559,119

(22) Filed: Jul. 26, 2012

(65) Prior Publication Data
US 2012/0287896 A1 Nov. 15, 2012

Related U.S. Application Data (63) Continuation of application No. 11/414,286, filed on Apr. 28, 2006, now Pat. No. 8,254,314.

(30) Foreign Application Priority Data

Apr. 28, 2005 (KR) .................. 10-2005-0035774

(51) Int. Cl.
H04W 72/12 (2009.01)
H04W 28/22 (2009.01)
H04L 1/00 (2006.01)

(52) U.S. Cl.
CPC ......... H04W 72/1284 (2013.01); H04L 1/0002 (2013.01); H04L 1/0025 (2013.01); H04L 1/0028 (2013.01); H04W 28/22 (2013.01)

(58) Field of Classification Search
CPC . H04W 72/0453; H04W 74/06; H04W 72/04; H04W 72/1284; H04L 1/0002; H04L 1/0025; H04L 1/0028
See application file for complete search history.

(56) References Cited

U.S. PATENT DOCUMENTS

| 6,069,883 A | 5/2000 | Ejzak et al. |
|---|---|---|
| 6,735,188 B1 * | 5/2004 | Becker et al. .................. 370/342 |

(Continued)

FOREIGN PATENT DOCUMENTS

| CN | 1503469 | 6/2004 |
|---|---|---|
| CN | 1536793 | 10/2004 |

(Continued)

OTHER PUBLICATIONS

IEEE Std 802.16e-2005—IEEE Standard for Local and metropolitan area networks; Part 16: Air Interface for Fixed and Mobile Broadband Wireless Access Systems Amendment 2: Physical and Medium Access Control Layers for Combined Fixed and Mobile Operation in Licensed Bands and Corrigendum 1; dated Dec. 7, 2005.*

(Continued)

Primary Examiner — Andrew Lai
Assistant Examiner — Hoyet H Andrews, III
(74) Attorney, Agent, or Firm — The Farrell Law Firm, P.C.

(57) ABSTRACT

An apparatus in a Base station (BS) and an apparatus in a Mobile Station (MS) are provided for allocating and requesting, respectively, uplink resources in a wireless communication system. The apparatus in the MS includes a transmitter for sending, to a base station, a predetermined Channel Quality Information CHannel (CQICH) codeword over a pre-allocated CQICH in a silence period, when an uplink bandwidth for an extended real-time Polling Service (ertPS) is not allocated to the mobile station, to inform the base station that the mobile station has data to send; and a receiver for receiving, from the base station, information related to an uplink bandwidth supporting a maximum rate allocated by the base station, in response to the CQICH codeword.

20 Claims, 7 Drawing Sheets

(56) References Cited

U.S. PATENT DOCUMENTS

| | | | |
|---|---|---|---|
| 6,898,195 B1 | 5/2005 | Molno et al. | |
| 6,950,399 B1 | 9/2005 | Bushmitch et al. | |
| 8,441,993 B2 * | 5/2013 | Son et al. | 370/329 |
| 2003/0219037 A1 | 11/2003 | Toskala et al. | |
| 2003/0224774 A1 | 12/2003 | Cheng et al. | |
| 2004/0001429 A1 * | 1/2004 | Ma et al. | 370/210 |
| 2004/0157635 A1 * | 8/2004 | Park et al. | 455/522 |
| 2004/0252666 A1 | 12/2004 | Johnson | |
| 2005/0025093 A1 * | 2/2005 | Yun et al. | 370/328 |
| 2012/0113949 A1 * | 5/2012 | Kim et al. | 370/329 |

FOREIGN PATENT DOCUMENTS

| | | |
|---|---|---|
| JP | 2002-094533 | 3/2002 |
| JP | 2004-129085 | 4/2004 |
| KR | 1020040045963 | 5/2004 |
| RU | 2 222 107 | 1/2004 |
| RU | 2 237 365 | 9/2004 |
| TW | 459463 | 10/2001 |
| TW | 546961 | 8/2003 |
| TW | I224932 | 12/2004 |
| WO | WO 01/86888 | 11/2001 |
| WO | WO 03/107694 | 12/2003 |
| WO | WO 2004/006603 | 1/2004 |
| WO | WO 2006/019267 | 2/2006 |

OTHER PUBLICATIONS

Myung-Kwang Byun et al., IEEE C802.16e-04/126r3, an IEEE 802.16 Broadband Wireless Access Working Group, titled; FAST_FEEDBACK Channel Codeword Extension, Date Submitted: Aug. 17, 2004.*

Hyoung Kyu Lim et al., IEEE C802.16e-05/243r2, an IEEE 802.16 Broadband Wireless Access Working Group, titled; "Refinement of the extended rtPS", Date Submitted: May 3, 2005.*

IEEE 802.16 Broadband Wireless Access Working Group, Extended rtPS for VoIP Services, IEEE C802.16e-041522r3, Jan. 24, 2005.

IEEE 802.16 Broadband Wireless Access Working Group, Clarification of CQICH Allocation Request Header, IEEE C802.16e-05/235r0, Apr. 27, 2005.

Howon Lee et al., Extended rtPS for VoIP Services, IEEE C802.16e-04/522, Nov. 4, 2004.

* cited by examiner

METHOD OF REQUESTING ALLOCATION OF UPLINK RESOURCES FOR EXTENDED REAL-TIME POLLING SERVICE IN A WIRELESS COMMUNICATION SYSTEM

PRIORITY

This application is a Continuation of U.S. application Ser. No. 11/414,286, which was filed in the U.S. Patent and Trademark Office on Apr. 28, 2006, and claims priority under 35 U.S.C. §119 to Korean Application Serial No. 2005-35774, which was filed in the Korean Intellectual Property Office on Apr. 28, 2005, the content of each of which is incorporated herein by reference.

BACKGROUND OF THE INVENTION

1. Field of the Invention

The present invention relates generally to an uplink scheduling method in a wireless communication system, and in particular, to a method of scheduling uplink resources for Extended Real-Time Polling Service (ertPS) supporting Voice over Internet Protocol (VoIP).

2. Description of the Related Art

A scheduling scheme is needed to efficiently use resources in a wireless communication system, which provides a variety of services with limited resources. It is ideal that unnecessarily allocated resources are rapidly returned and re-allocated to necessary services. Also, it is necessary to reduce the amount of information sent with wireless resources and use the extra resources for other purposes.

Many uplink scheduling schemes have been proposed for VoIP. They include Unsolicited Grant Service (UGS), Real-Time Polling Service (rtPS), and ertPS.

In UGS, a fixed amount of uplink resources are allocated upon user request. Hence, a user transmits data with the allocated uplink resources. rtPS allocates required resources in response to a periodic uplink resource allocation request from the user. The user transmits data with resources appropriately allocated according to the amount of the data.

Figure 1:
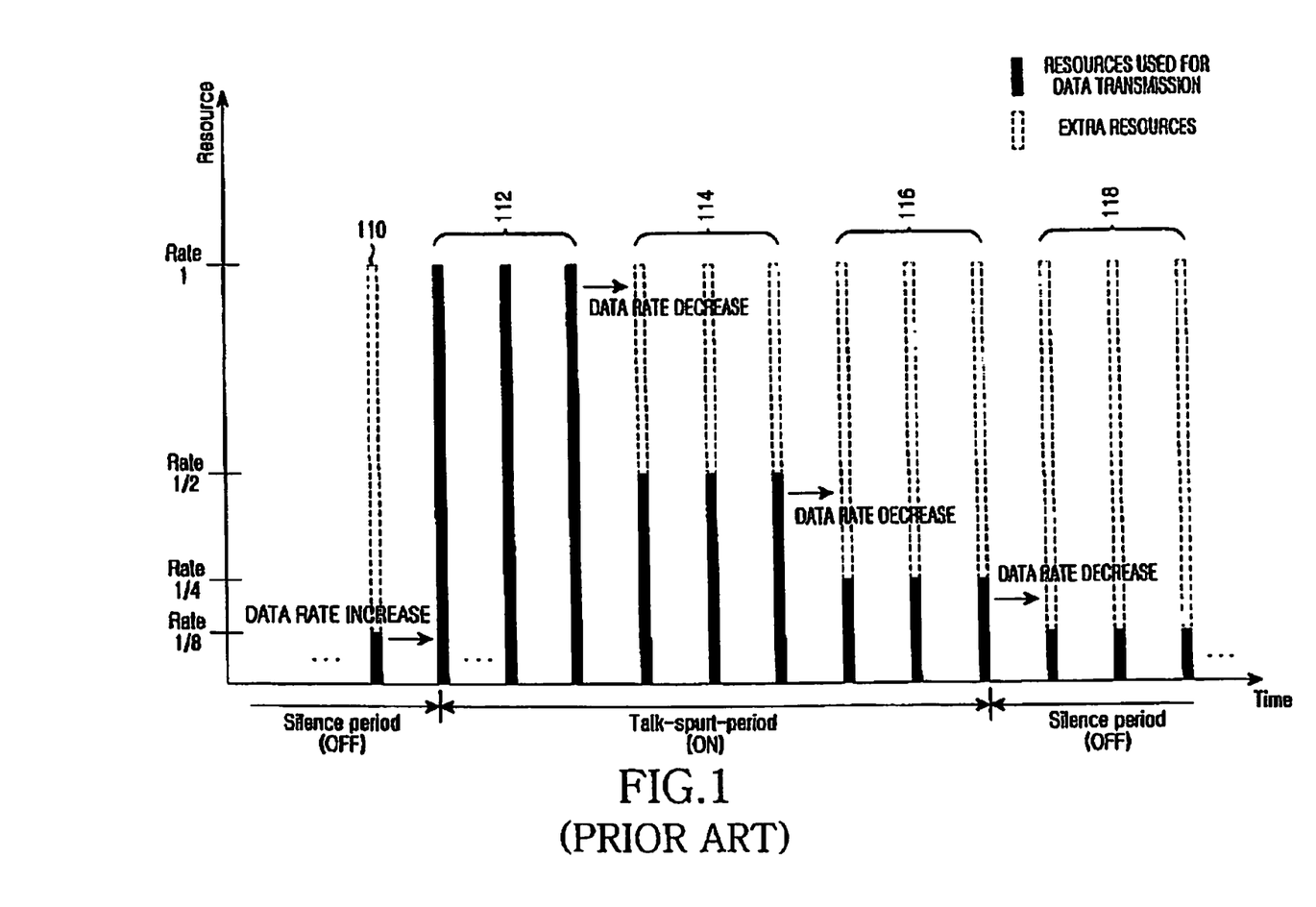
FIG. 1 illustrates a conventional uplink scheduling for UGS.

FIG. 1 illustrates a conventional uplink resource scheduling for UGS.

Referring to FIG. 1, the status of a Mobile Station (MS) is divided into a talk-spurt period and a silence period on the time axis. The talk-spurt period is an on-period with transmission of data packets from the MS, while the silence period is an off-period without any transmission of data packet. The same resources are allocated to the MS during both periods. In the illustrated case of FIG. 1, resources supporting a full rate, Rate 1 are constantly allocated.

However, the MS does not use all the allocated resources in transmitting data. During silence periods 110 and 118, the MS uses only minimum resources required to maintain the service (e.g. Rate 1/8).

It occurs that only a fraction of the allocated resources are used during the talk-spurt period. In other words, the MS transmits data packets using the whole or part of the resources during the talk-spurt period. For instance, the MS transmits data packets at Rate 1, that is, using the entire allocated resources during a talk-spurt period 112. Yet, it uses Rate 1/2 (i.e. half of the resources) during a talk-spurt period 114. As the amount of transmission data is further reduced, the MS transmits the data packets at Rate 1/4 (i.e. 1/4 of the resources) during a talk-spurt period 116. During a silence period 118, the MS uses the minimum resources supporting the minimum rate, Rate 1/8.

As described above, the constantly allocated resources are not fully utilized during the periods 114, 116 and 118. The existence of the resulting extra resources implies inefficient uplink scheduling. Therefore, uplink resources are wasted during the talk-spurt periods as well as during the silence periods.

Figure 2:
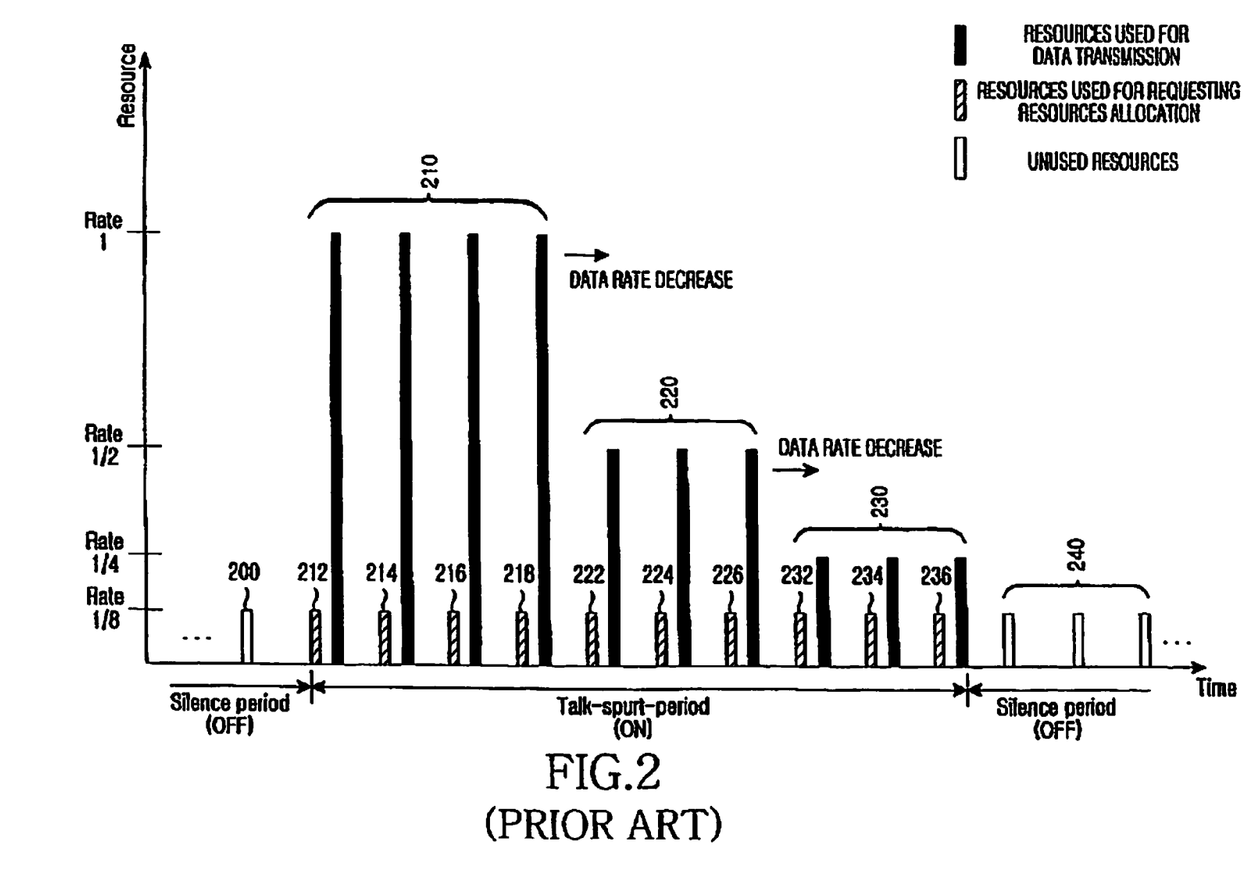
FIG. 2 illustrates a conventional uplink scheduling for rtPS.

FIG. 2 illustrates a conventional uplink resource scheduling for rtPS.

Referring to FIG. 2, the status of an MS is divided into a talk-spurt period and a silence period on the time axis. The talk-spurt period is an on-period with transmission of data packets to be sent from the MS, while the silence period is an off-period without any transmission of data packet.

In rtPS, the MS requests uplink resource allocation to a base station (BS) in steps 212 to 236. The requested resources are decided based on the amount of packet data to be transmitted from the MS. The BS allocates the requested uplink resources to the MS. The MS then transmits the data packets using the allocated resources during periods 210, 220 and 230.

In the illustrated case of FIG. 2, there are three talk-spurt periods 210, 220 and 230 according to data rates. The MS transmits data at Rate 1 during the first talk-spurt period 210, at Rate 1/2 during the second talk-spurt period 220, and at Rate 1/4 during the third talk-spurt period 230. Therefore, the MS uses different amounts of resources during the periods. The talk-spurt periods change from 210 to 230 due to the decrease of data rate.

More specifically, upon generation of data packets to be transmitted, the MS requests resource allocation in step 212. The BS then allocates maximum resources to support a maximum rate (e.g. Rate 1). The MS transmits the data packets at Rate 1 using the allocated resources. The transmission of data packets at Rate 1 is repeated during the talk-spurt period 210.

As the amount of transmission data is reduced, and thus the data rate needs to be changed, the MS requests resource allocation supporting the decreased data rate (e.g. Rate 1/2) in step 222. The MS then transmits the data packets using allocated resources. The transmission of data packets at Rate 1/2 is repeated during the talk-spurt period 220.

When the data rate is further decreased during the talk-spurt period 230, the MS requests allocation of resources supporting the further decreased data rate (e.g. Rate 1/4) in step 232. The MS then transmits data packets at Rate 1/4. The transmission of data packets at Rate 1/4 is repeated during the talk-spurt period 230.

After completing the data packet transmission, the MS operates using the minimum resources (e.g. Rate 1/8) during a silence period 240.

As noted from the above description, rtPS requires periodic polling (i.e. uplink resource request, steps 212 to 218, steps 222 to 226, and steps 232 to 236). Even within a period requiring the same amount of resources 210, 220 or 230, periodic polling takes place (in steps 214 to 218, steps 224 and 226, or steps 234 and 236). The unnecessary polling leads to a waste of uplink resources.

Since both UGS and rtPS allocate uplink resources periodically according to scheduling type irrespective of the real-time status of the MS, uplink scheduling cannot be performed efficiently, reflecting the time-variant status of the MS.

Compared to UGS and real time Polling Service (rtPS), Extended-real time Polling Service (ertPS) allocates resources upon a MS request and enables transmission of data packets using the allocated resources without polling until the resources are changed. The MS expects to receive the same resources from the BS without any further polling in ertPS.

When a data rate decrease is required, the MS transmits data packets at the decreased data rate. Simultaneously, the MS notifies the BS of the change of resources due to the decrease of the data rate. Therefore, the BS can use the extra resources saved from the MS for other purposes.

The MS uses the Extended PiggyBack Request (PBR) field of a Grant

Management subheader to notify the BS of the change of the data rate. The Grant Management subheader has the following configuration.

TABLE 1

| Syntax | Size (bits) | Notes |
|---|---|---|
| Grant Management Subheader { | — | — |
|   if (scheduling service type==UGS) { | — | — |
|     SI | 1 | — |
|     PM | 1 | — |
|     FLI | 1 | — |
|     FL | 4 | — |
|     Reserved | 9 | Shall be set to zero |
|   } else if (scheduling service type==Extended rtPS) { | — | — |
|     Extended piggyback request | 11 | — |
|     FLI | 1 | — |
|     FL | 4 | — |
|   } else { | — | — |
|     Piggyback Request | 16 | — |
|   } | — | — |
| } | — | — |

In Table 1, one Most Significant Bit (MSB) of Extended PBR is used as an indicator indicating the change of data rate. If the MSB is set to 1, it implies that the data rate is changed. The remaining 10 Least Significant Bits (LSBs) of Extended PBR indicate the changed data rate. If the MSB is set to 0, it implies that the data rate is unchanged.

Alternatively, the MS can request allocation of a bandwidth corresponding to a requested data rate by the Bandwidth Request (BR) field of a BR and Uplink (UL) transmit power report header which is formatted as follows.

TABLE 2

| HT = 1 (1) | EC = 0 (1) | Type(3) = 0b011 | BR(11) |
|---|---|---|---|
| | UL TX Power (8) | | CID MSB (8) |
| | CID LSB (8) | | HCS (8) |

Referring to Table 2, one MSB of BR is used as an indicator indicating the change of data rate. If the MSB is set to 1, it implies that the data rate is changed. The 10 LSBs of BR indicate the changed data rate. If the MSB is set to 0, it implies that BR and UL transmit power report header is a typical header requesting a bandwidth for resource allocation.

Figure 3:
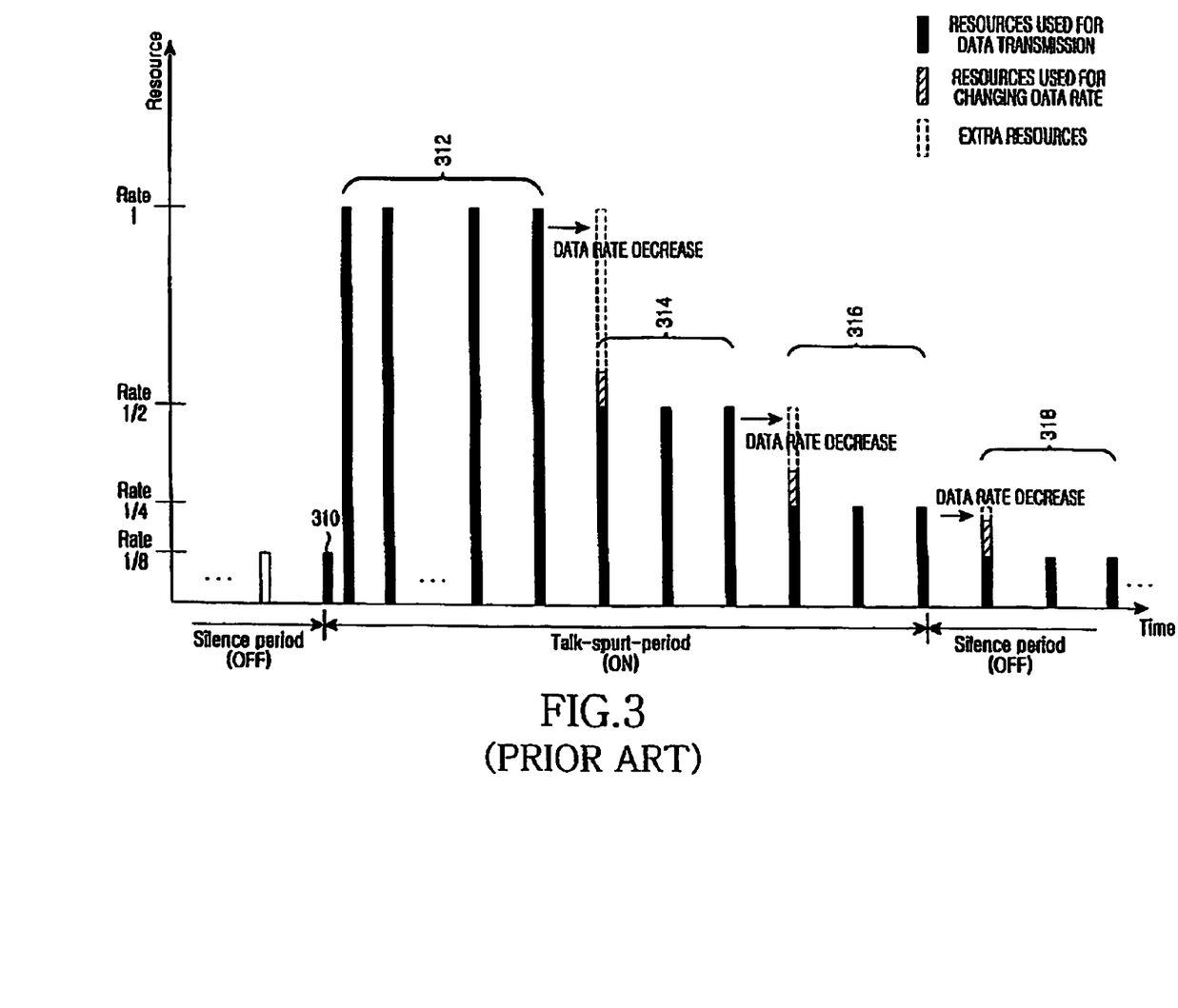
FIG. 3 illustrates a conventional uplink scheduling for ertPS.

FIG. 3 illustrates a conventional uplink scheduling for ertPS.

Referring to FIG. 3, the status of an MS is divided into a talk-spurt period and a silence period on the time axis. The talk-spurt period is an on-period with transmission of data packets to be sent from the MS, while the silence period is an off-period without any transmission of data packet.

When transitioning from the silence period to the talk-spurt period, the MS requests resource allocation to the BS by a BR header in step 310. Table 2 above showing the bandwidth request and uplink transmit power report header is an example of the BR header. The BR header carries bandwidth request information requesting allocation of the same resources without any further polling.

Upon receipt of the BR header, the BS allocates resources corresponding to a maximum data rate periodically to the MS during the talk-spurt period 312. The MS transmits data at the maximum data rate.

When the data rate is to be changed, the MS transmits data at the changed data rate during the next talk-spurt period. The changed data rate is lower than the previous data rate. In the illustrated case Rate 1 decreases to Rate 1/2. Meanwhile, the MS notifies the BS of the change of data rate by a Grant Management subheader. Then the MS transmits data at the changed data rate periodically during the talk-spurt period 314.

Upon receipt of the Grant Management subheader, the BS allocates as minimum resources as supporting Rate 1/2. The BS then allocates the extra resources saved from the MS for other purposes.

If the data rate is further to be decreased during data transmission at Rate 1/2, the MS transmits data at Rate 1/4 during the next talk-spurt period 316. Meanwhile, the MS notifies the BS of the change of data rate by a Grant Management subheader. Then the MS transmits data at the changed data rate periodically during the talk-spurt period 316. The BS allocates as minimum resources as supporting Rate 1/4.

If the data rate is further to be decreased during data transmission at Rate 1/4, the MS changes the data rate to Rate 1/8 for the next talk-spurt period. Meanwhile, the MS notifies the BS of the change of data rate by a Grant Management subheader. The BS then allocates as minimum resources as supporting Rate 1/8.

As described above, when the data rate decreases, the MS transmits information about the changed data rate to the BS by the Grant Management subheader, and the BS allocates resources to the MS according to the changed data rate.

However, it may occur that the MS wants to increase the decreased data rate during the talk-spurt period. In order to transmit uplink data at the increased data rate, the MS needs as much as possible uplink resources. However, there is no specified method for notifying the BS of the intention of the MS regarding the increase of the data rate. Accordingly, there exists a need for a method of increasing a decreased data rate in an MS during a talk-spurt period.

Conventionally, the BS periodically allocates resources supporting the minimum data rate to the MS during the silence period, and the MS, when transitioning from the silence period to the talk-spurt period, requests a bandwidth using the minimum resources. During the silence period, hence, the BS periodically allocates the MS uplink resources supporting transmission of a 6-byte BR header or uplink resources supporting transmission of a BR subheader in the form of a piggy back request as illustrated in Table 1, that is, a 6-byte Generic Medium Access Control (MAC) header and a 2-byte Grant Management subheader. While these minimum resources are needed for the MS to request a bandwidth for transitioning from the silence period to the talk-spurt period, the periodic resource allocation may not be needed because the MS does not know when to transition to the talk-spurt period.

SUMMARY OF THE INVENTION

The present invention is designed to substantially solve at least the above problems and/or disadvantages and to provide at least the advantages below.

Accordingly, an aspect of the present invention is to provide a method of requesting resource allocation to a BS when an MS is to increase data rate for ertPS in a wireless communication system.

Another aspect of the present invention is to provide a method of efficiently using uplink resources by saving uplink resources from an MS, which is in a silence period due to the absence of transmission data in ertPS.

According to an aspect of the present invention, in an apparatus in a mobile station is provided for requesting uplink resources in a wireless communication system. The apparatus includes a transmitter for sending, to a base station, a predetermined Channel Quality Information CHannel (CQICH) codeword over a pre-allocated CQICH in a silence period, when an uplink bandwidth for an extended real-time Polling Service (ertPS) is not allocated to the mobile station, to inform the base station that the mobile station has data to send; and a receiver for receiving, from the base station, information related to an uplink bandwidth supporting a maximum rate allocated by the base station, in response to the CQICH codeword.

According to another aspect of the present invention, an apparatus in a base station is provided for allocating uplink resources in a wireless communication system. The apparatus includes a receiver for receiving, from a mobile station, in a silence period, when an uplink bandwidth for an extended real-time Polling Service (ertPS) is not allocated to the mobile station, a predetermined Channel Quality Information CHannel (CQICH) codeword over a pre-allocated CQICH, the CQICH codeword informing the base station that the mobile station has data to send; and a transmitter for transmitting, to the mobile station, an allocation information on an uplink bandwidth supporting a maximum rate, in response to the CQICH codeword.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE INVENTION

Various embodiments of the present invention will be described herein below with reference to the accompanying drawings. In the following description, well-known functions or constructions are not described in detail since they would obscure the invention in unnecessary detail.

The present invention provides a method of increasing the data rate of a Mobile Station (MS) in Extended-real time Polling Service (ertPS) uplink scheduling. It is assumed that the MS is transmitting data packets at a lower rate than a maximum rate.

For this purpose, a method of transmitting rate increase information requesting a rate increase to a BS (Base Station) by the MS is provided.

Conventionally, when the data rate is equivalent to no data transmission, minimum resources supporting a minimum rate are periodically allocated. In contrast, resources are allocated only upon request of the MS in the present invention.

Regarding uplink scheduling according to the present invention, the operations of the MS and the BS will be separately described below.

A. MS Operation

Figure 4:
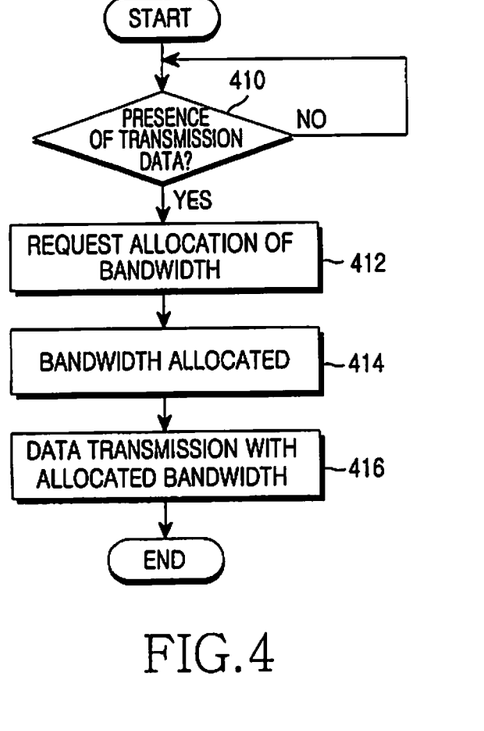
FIGS. 4 and 5 are flowcharts diagram illustrating an operation for uplink scheduling for ertPS in an MS according to the present invention.
Figure 5:
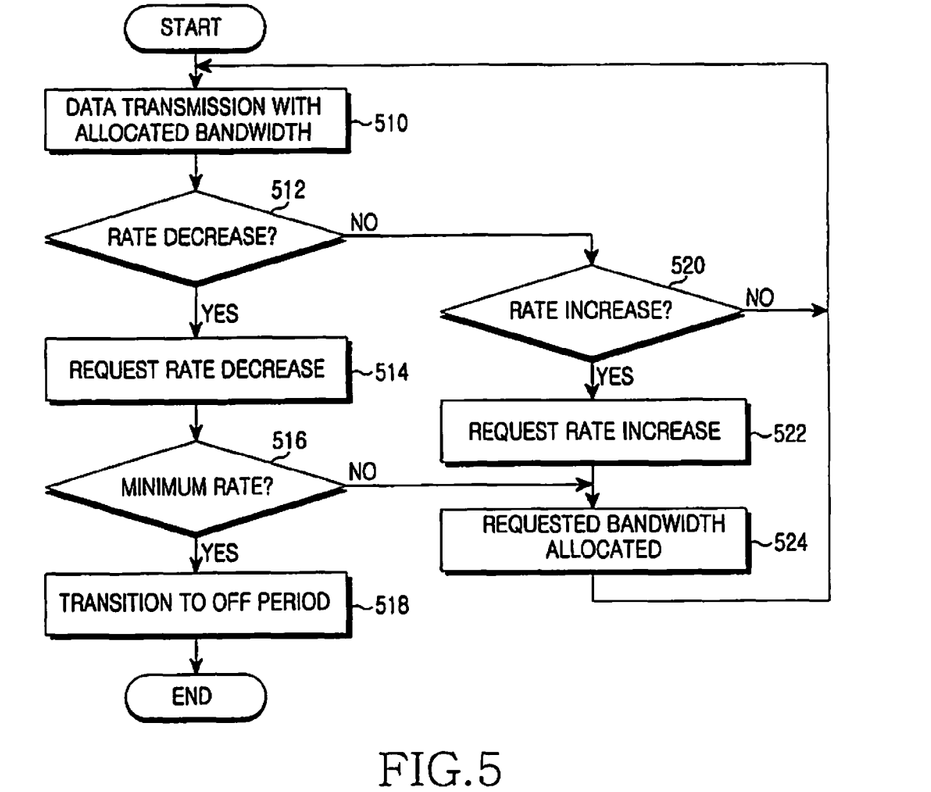

FIGS. 4 and 5 are flowchart diagrams illustrating an operation for uplink scheduling for ertPS in the MS according to the present invention. Specifically, FIG. 4 is a flowchart diagram illustrating an MS operation when the MS is not transmitting data and FIG. 5 is a flowchart diagram illustrating an MS operation when the MS is transmitting data.

Referring to FIG. 4, the MS monitors the presence or absence of transmission data in step 410. In the absence of transmission data, the MS is kept in an off state. In the presence of transmission data, the MS requests bandwidth allocation in step 412. The present invention is based on the premise that resources are not allocated to the MS in an initial state, i.e. in an off state. Therefore, a novel technique must be developed for the MS in the off state to request bandwidth allocation, which will be described later in detail.

In step 414, the MS is allocated a bandwidth from the BS. The bandwidth is one requested by the MS or a bandwidth supporting a predetermined maximum rate. In the present invention, the latter case is assumed. The MS starts data transmission at a data rate corresponding to the bandwidth in step 416.

The MS, which has initiated the data transmission in the procedure of FIG. 4, continues its operation in an on state according to the procedure of FIG. 5.

Referring to FIG. 5, the MS transmits data at the data rate corresponding to the bandwidth in step 510. During the data transmission, the MS determines whether the data rate needs to be changed (i.e. increase or decrease in steps 512 and 520). If neither a rate increase nor a rate decrease is required, the MS continues data transmission at the current data rate in step 510.

However, if a rate decrease is required, the MS requests a rate decrease in step 514. The MS determines whether the requested data rate is a minimum rate in step 516.

In case of the minimum rate, the MS transitions to the off state, considering that the allocated bandwidth has been released in step 518 because resources are not allocated to the MS in an off-state in the present invention. The MS then operates in the procedure of FIG. 4.

The minimum rate is a data rate that does not affect the quality of communication even though the MS transmits no data. In general, the minimum rate is Rate 1/8 or lower. In this case, the MS sets the MSB of the Extended PiggyBack Request (PBR) field of the Grant Management subheader to 1 and sets the 10 LSBs to Rate 1/8 or lower in order to request a rate decrease. Consequently, the BS does not need to allocate a bandwidth to the following frames any more.

If the requested rate is not the minimum rate, the MS is allocated a reduced bandwidth in step 524. The MS then continues data transmission at a data rate corresponding to the allocated bandwidth in step 510.

On the other hand, if a rate increase is required, the MS requests a rate increase in step 522. For the rate increase, an extra bandwidth must be available. Therefore, the present invention provides a method of allocating an additional bandwidth for a rate increase request, which will be described later in detail.

In step 524, the MS is allocated an increased bandwidth. The MS then returns to step 510 in which it continues data transmission at a data rate corresponding to the allocated bandwidth.

The bandwidth allocation request step 412 and the rate increase request step 522 will be described in detail below.

Requesting a bandwidth allocation and a rate increase can be considered in two ways: by a general bandwidth request (BR) header or by a codeword over a Channel Quality Information CHannel (CQICH) (i.e. CQICH codeword). The rate increase request is applied when a lower rate than a maximum rate negotiated during an initial service setup is used.

Regarding the use of the bandwidth request header, for example, the MS can use the BR field and UL transmit power report header as the bandwidth request header. Besides, the MS can use any header that can carry a bandwidth request, such as a PBR. Meanwhile, when increasing a data rate, the MS transmits a bandwidth request header containing a requested bandwidth. The BS then allocates uplink resources corresponding to the requested bandwidth to the MS. For example, the BS allocates a predetermined maximum bandwidth in case of a bandwidth allocation request or the requested bandwidth in case of a rate increase request.

To transmit the bandwidth request header, the MS needs to be allocated uplink resources. Thus, the MS transmits a bandwidth request code to request allocation of uplink resources for transmission of the bandwidth request header.

The MS can transmit the bandwidth request code in an uplink slot allocated for use in requesting a bandwidth (bandwidth request slot). The uplink bandwidth request slot is a slot used for ranging in an existing wireless network. Hence, the uplink bandwidth request slot is available without allocation of additional resources. L of 255 codes are pre-defined as bandwidth request codes for allocation of uplink resources. L is the positive integer.

The MS selects one of the L bandwidth request codes and transmits the selected bandwidth request code in the bandwidth request slot. The bandwidth request then allocates uplink resources required for transmission of the bandwidth request header.

As described above, the MS requests uplink resources for transmission of a bandwidth request header by transmitting a bandwidth request code. The MS can transmit the bandwidth request header using resources allocated by the BS. The bandwidth request field of the bandwidth request header contains information about uplink resources supporting a requested data rate.

Regarding transmission of a CQICH codeword, the MS generally delivers feedback information or anchor BS switching information in a Fast Base Station Switching (FBSS) operation on the CQICH. For each operation, a CQICH codeword is predetermined. Hence, the MS transmits a CQICH codeword corresponding to an intended operation on the CQICH channel. In accordance with the present invention, one of predetermined CQICH codewords is used to increase a decreased data rate or request bandwidth allocation in an off state, for ertPS. The MS, which supports ertPS, transmits a CQICH codeword predetermined for using a high data rate or a CQICH codeword predetermined for bandwidth allocation on the CQICH. The transmitted CQICH codeword is predefined to request uplink resources to the BS.

Upon receipt of the CQICH codeword, the BS recognizes that the MS requests a rate increase or bandwidth allocation. The BS then allocates uplink resources supporting the maximum rate or uplink resources supporting a requested rate increase to the MS. The maximum rate is determined by an initial service negotiation procedure between the MS and the BS.

B. BS Operation

Figure 6:
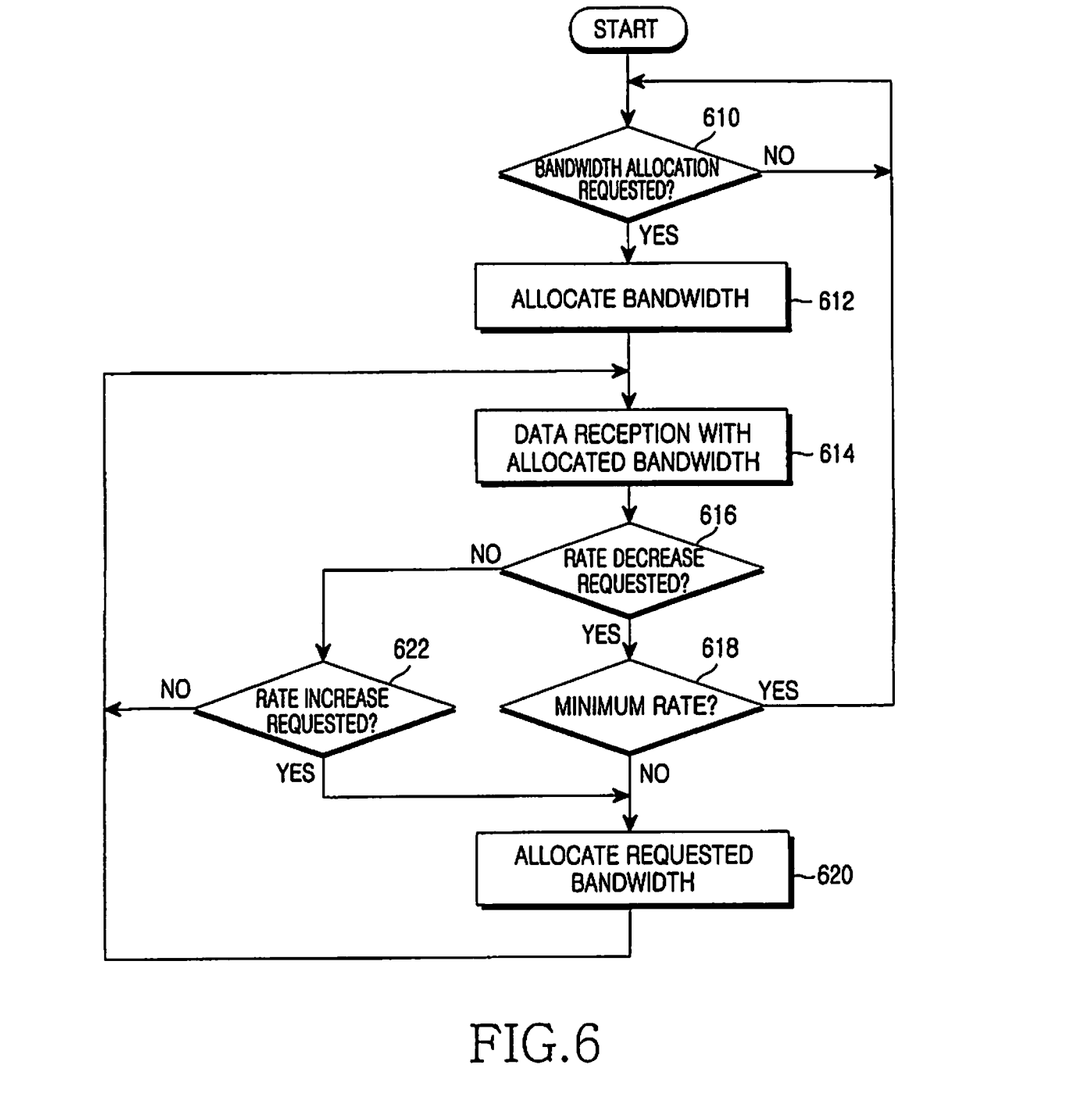
FIG. 6 is a flowchart diagram illustrating an operation for uplink scheduling for ertPS in a BS according to the present invention.

FIG. 6 is a flowchart diagram illustrating an operation for uplink scheduling for ertPS in the BS according to the present invention.

Referring to FIG. 6, the BS monitors reception of a bandwidth allocation request from the MS in an off state in step 610. The bandwidth allocation is requested by a bandwidth request header, a bandwidth request code or a CQICH codeword from the MS.

Upon receipt of the bandwidth allocation request, the BS allocates a requested bandwidth by the MS or a bandwidth supporting a maximum rate decided during an initial service negotiation with the MS in step 612 and receives data from the MS at a rate corresponding to the allocated bandwidth.

In step 616, the BS determines whether a Grant Management subheader requesting a decrease of the current bandwidth is piggybacked in the received data. In the absence of the bandwidth decrease request, the BS monitors reception of a rate increase request in step 622.

In the absence of the rate increase request, the BS receives data by re-allocating the current bandwidth in step 614, considering that there is no change in the data rate of the MS.

On the contrary, upon receipt of the rate increase request, the BS allocates the requested bandwidth in step 620. If the rate increase request does not provide information about the requested data rate, the BS can allocate the bandwidth supporting the maximum rate. The rate increase request is also made by one of a bandwidth request header, a bandwidth request code and a CQICH codeword.

If receiving the Grant Management subheader including rate change information (i.e. the rate decrease request) in step 616, the BS determines whether the requested rate is a minimum rate in step 618. The minimum rate is a non-zero data rate that does not affect communication quality even though the MS transmits no data.

If the requested rate is not the minimum rate, the BS allocates a bandwidth based on the data rate set in the Grant Management subheader in step 620. In step 614, the BS receives data using the newly allocated bandwidth.

In case of the minimum rate, the BS determines that the MS will not transmit any more data. Thus, the BS determines whether the MS requests bandwidth allocation, without allocating any further bandwidth, in step 610. Also, when the 10 LSBs of the Extended PBR of the Grant Management subheader are 0, the BS does not allocate a bandwidth from the next frame on.

C. Signaling

Figure 7:
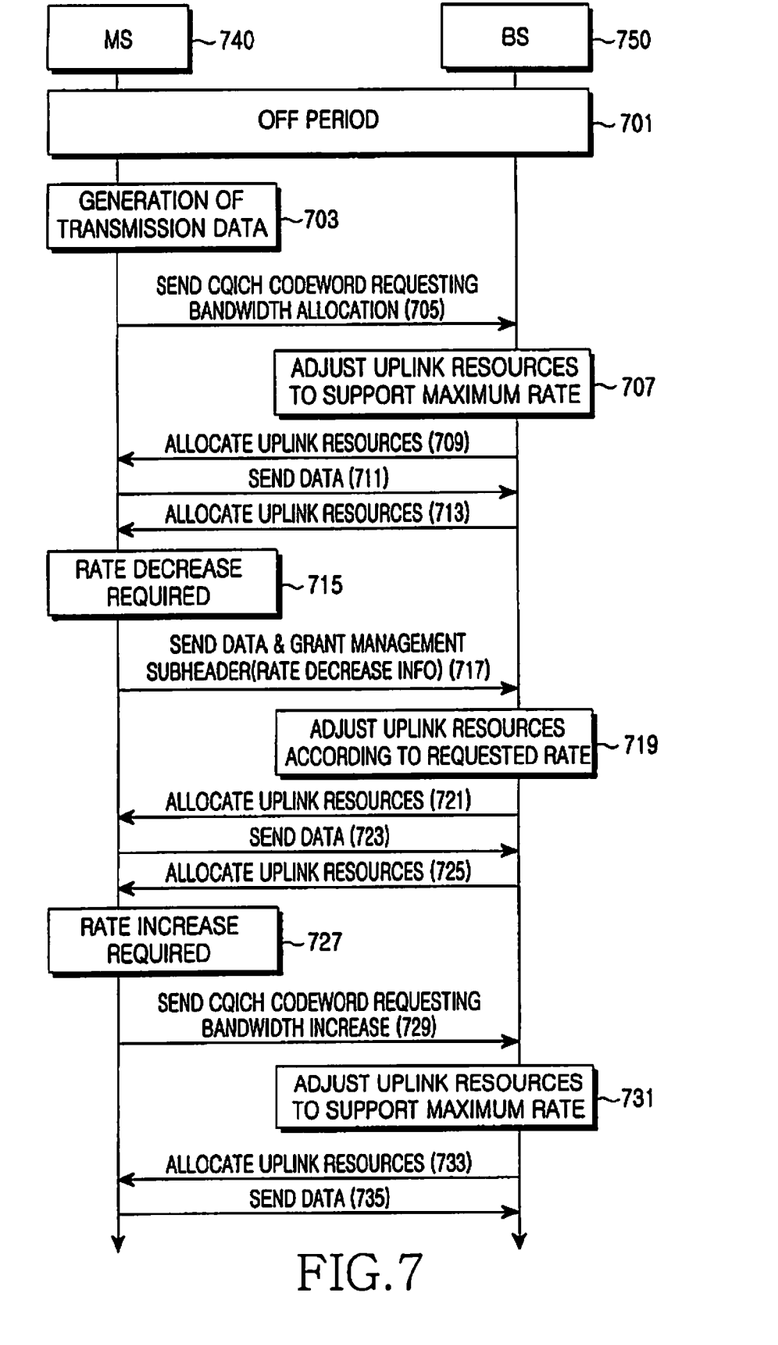
FIG. 7 is a diagram illustrating a signal flow between the MS and the BS for uplink scheduling in ertPS according to the present invention.

FIG. 7 is a diagram illustrating a signal flow between the MS and the BS for uplink scheduling in ertPS according to the present invention.

Referring to FIG. 7, an MS 740 has no data to transmit to a BS 750 and thus stays in an off period in step 701. Upon generation of transmission data in step 703, the MS 740 transmits to the BS 750 a codeword requesting bandwidth allocation for data transmission on a CQICH in step 705. In step 707, the BS 750 determines that the MS 740 needs uplink resources supporting a maximum rate. The BS then allocates the uplink resources corresponding to the maximum rate to the MS 740 in step 709. In step 711, the MS transmits data to the BS 750 using the allocated uplink resources. The BS 750 periodically allocates the uplink resources in step 713. The MS 740 and the BS 750 repeat steps 711 and 713 until the data rate of the MS 740 is changed. The periodic uplink resources allocated by the BS have been decided in step 707.

When the MS 740 is to decrease the data rate in step 715, it transmits data piggybacked with a Grant Management subheader to the BS 750 in step 717. The Grant Management subheader contains information indicating a decreased requested rate. The BS 750 recognizes from the Grant Management subheader that the MS 740 is to decrease the data rate in step 719 and allocates uplink resources corresponding to the requested data rate to the MS 740 in step 721. In step 723, the MS 740 transmits data using the allocated uplink resources. In step 725, the BS 750 allocates the same uplink resources for the next data. If the data rate is maintained, the MS 740 and the BS 750 repeat steps 723 and 725. The uplink resources allocated to the MS 740 during these steps have been decided in step 719.

When the MS 740 is to increase the data rate in step 727, it transmits a codeword requesting a bandwidth increase data to the BS 750 on the CQICH in step 729. The BS 750 increases uplink resources so as to support the maximum rate in step 731 and allocates them to the MS 740 in step 733. In step 735, the MS 740 transmits data using the allocated uplink resources.

As described above, the present invention is directed to a method of requesting allocation of requested uplink resources to a BS according to a change in data rate by an MS in uplink resource scheduling for ertPS in a wireless communication system. For this purpose, the MS, when increasing its data rate, notifies the BS of the rate increase.

If the MS has no data to transmit and thus transitions to an off period in ertPS for which the BS periodically allocates resources to the MS, the BS does not allocate uplink resources to the MS, thereby reducing overhead from resource allocation. Therefore, the extra uplink resources which might otherwise be allocated to the MS in the off period can be efficiently used for other purposes.

While the present invention has been shown and described with reference to certain embodiments thereof, it will be understood by those skilled in the art that various changes in form and details may be made therein without departing from the spirit and scope of the invention as defined by the appended claims.

What is claimed is:

1. An apparatus in a mobile station for requesting uplink resources in a wireless communication system, the apparatus comprising:
   a transmitting unit configured to transmit, to a base station, a predetermined codeword related to channel quality information over a channel for reporting channel quality in a case that an uplink bandwidth for a service for real-time support is not allocated to the mobile station, to inform the base station that the mobile station has data to send; and
   a receiving unit configured to receive, from the base station, information related to an uplink bandwidth supporting a maximum rate allocated by the base station, in response to the codeword.

2. The apparatus of claim 1, wherein the service for the real-time support includes an extended real-time Polling Service (ertPS).

3. The apparatus of claim 2, wherein the uplink bandwidth for the ertPS is not allocated to the mobile station during an off period of the ertPS between the mobile station and the base station.

4. The apparatus of claim 2, wherein the transmitting unit is further configured to transmit, to the base station, an extended Piggyback Request (PBR) field of a Grant Management SubHeader (GMSH) in a case that the uplink bandwidth for the ertPS is allocated to the mobile station, in order to request a change of the uplink bandwidth for the ertPS.

5. The apparatus of claim 2, wherein the transmitting unit is further configured to transmit, to the base station, a Bandwidth Request (BR) field of a bandwidth request and an uplink transmit power report header in a case that the uplink bandwidth for the ertPS is allocated to the mobile station, in order to request a change of the uplink bandwidth for the ertPS.

6. An apparatus in a base station for allocating uplink resources in a wireless communication system, the apparatus comprising:
   a receiving unit configured to receive, from a mobile station, in a case that an uplink bandwidth for a service for real-time support is not allocated to the mobile station, a predetermined codeword related to channel quality information over a channel for reporting channel quality the codeword informing the base station that the mobile station has data to send; and
   a transmitting unit configured to transmit, to the mobile station, allocation information on an uplink bandwidth supporting a maximum rate, in response to the codeword.

7. The apparatus of claim 6, wherein the service for the real-time support includes an extended real-time Polling Service (ertPS).

8. The apparatus of claim 7, wherein the uplink bandwidth for the ertPS is not allocated to the mobile station during an off period of the ertPS between the mobile station and the base station.

9. The apparatus of claim 7, wherein the receiving unit is further configured to receive, from the mobile station, an extended Piggyback Request (PBR) field of a Grant Management SubHeader (GMSH) in a case that the uplink bandwidth for the ertPS is allocated to the mobile station, to request a change of the uplink bandwidth for the ertPS.

10. The apparatus of claim 7, wherein the receiving unit is further configured to receive, from the mobile station, a Bandwidth Request (BR) field of a bandwidth request and an uplink transmit power report header in a case that the uplink bandwidth for the ertPS is allocated to the mobile station, to request a change of the uplink bandwidth for the ertPS.

11. A method for requesting uplink resources by a mobile station in a wireless communication system, the method comprising:
    transmitting, to a base station, a predetermined codeword related to channel quality information over a channel for reporting channel quality in a case that an uplink bandwidth for a service for a real-time support is not allocated to the mobile station, to inform the base station that the mobile station has data to send; and
    receiving, from the base station, information related to an uplink bandwidth supporting a maximum rate allocated by the base station in response to the codeword.

12. The method of claim 11, wherein the service for a real-time support includes an extended real-time Polling Service (ertPS).

13. The method of claim 12, wherein the uplink bandwidth for the ertPS is not allocated to the mobile station during an off period of the ertPS between the mobile station and the base station.

14. The method of claim 12, further comprising transmitting, to the base station, an extended Piggyback Request (PBR) field of a Grant Management SubHeader (GMSH) in a case that the uplink bandwidth for the ertPS is allocated to the mobile station, to request a change of the uplink bandwidth for the ertPS.

15. The method of claim 12, further comprising transmitting, to the base station, a Bandwidth Request (BR) field of a bandwidth request and an uplink transmit power report header in a period when the uplink bandwidth for the ertPS is allocated to the mobile station, to request a change of the uplink bandwidth for the ertPS.

16. A method for allocating uplink resources by a base station in a wireless communication system, the method comprising:
    receiving, from a mobile station, in a case that an uplink bandwidth for a service for real-time support is not allocated to the mobile station, a predetermined codeword related to channel quality information over a channel for reporting channel quality, the codeword informing the base station that the mobile station has data to send; and
    transmitting, to the mobile station, allocation information of an uplink bandwidth supporting a maximum rate, in response to the codeword.

17. The method of claim 16, wherein the service for a real-time support includes an extended real-time Polling Service (ertPS).

18. The method of claim 17, wherein the uplink bandwidth for the ertPS is not allocated to the mobile station during an off period of the ertPS between the mobile station and the base station.

19. The method of claim 17, further comprising receiving, from the mobile station, an extended Piggyback Request (PBR) field of a Grant Management SubHeader (GMSH) in a period when the uplink bandwidth for the ertPS is allocated to the mobile station, to request a change of the uplink bandwidth for the ertPS.

20. The method of claim 17, further comprising receiving, from the mobile station, a Bandwidth Request (BR) field of a bandwidth request and an uplink transmit power report header in a case that the uplink bandwidth for the ertPS is allocated to the mobile station, to request a change of the uplink bandwidth for the ertPS.

* * * * *